United States Patent [19]

Hayashi et al.

[11] Patent Number: 5,471,282

[45] Date of Patent: Nov. 28, 1995

[54] DEPOSITED TONER QUANTITY MEASURING METHOD AND IMAGE FORMING APPARATUS USING THE SAME

[75] Inventors: Koji Hayashi; Takashi Bisaiji, both of Yokohama, Japan

[73] Assignee: Ricoh Company, Ltd., Tokyo, Japan

[21] Appl. No.: 168,155

[22] Filed: Dec. 17, 1993

[30] Foreign Application Priority Data

Dec. 19, 1992 [JP] Japan ..................................... 4-355921

[51] Int. Cl.[6] .................................................. G03G 15/00
[52] U.S. Cl. ........................... 355/203; 355/246; 356/445
[58] Field of Search ..................................... 355/203, 208, 355/214, 246; 430/31; 356/445, 446

[56] References Cited

U.S. PATENT DOCUMENTS

| | | |
|---|---|---|
| 4,618,248 | 10/1986 | Buchar. |
| 5,005,050 | 4/1991 | Donivan et al.. |
| 5,060,013 | 10/1991 | Spence. |
| 5,146,269 | 9/1992 | Shimizu et al.. |
| 5,162,850 | 11/1992 | Nakashima. |
| 5,206,686 | 4/1993 | Fukui et al.. |
| 5,305,057 | 4/1994 | Hattori et al. ........................... 355/203 |

FOREIGN PATENT DOCUMENTS

| | | |
|---|---|---|
| 60-260067 | 12/1985 | Japan. |
| 61-254961 | 11/1986 | Japan. |
| 4-126462 | 4/1992 | Japan. |

*Primary Examiner*—Joan H. Pendegrass
*Attorney, Agent, or Firm*—Oblon, Spivak, McClelland, Maier, & Neustadt

[57] ABSTRACT

The deposited toner quantity measuring method and image forming apparatus using the same according to the present invention estimates the development characteristics from a quantity of deposited toner obtained by the optional sensor and from a result of detection by the electric potential sensor, and corrects an image signal from the estimated development characteristics.

14 Claims, 14 Drawing Sheets

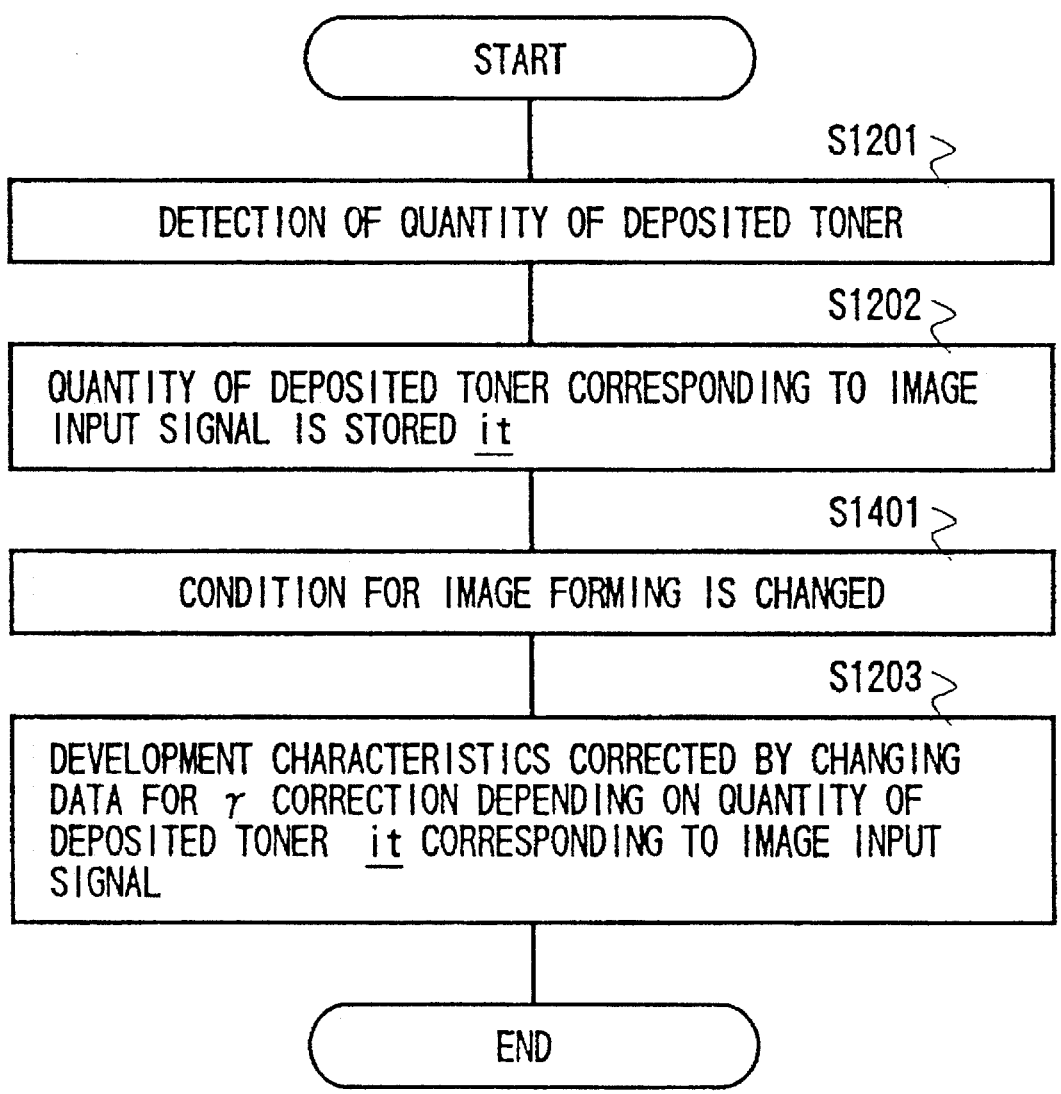

DEPOSITED TONER QUANTITY MEASURING METHOD AND IMAGE FORMING APPARATUS USING THE SAME

FIELD OF THE INVENTION

The present invention relates to a deposited toner quantity measuring method to measure a quantity of deposited toner corresponding to a gradient of a gradated density pattern by irradiating a beam to a visual image of a gradated density pattern formed on an image carrier and detecting a quantity of reflected light with an electrophotosensitive chip and an image forming apparatus using the same.

BACKGROUND OF THE INVENTION

As a conventional type of image forming apparatus based on an electrophotographic system, there is, for instance, an image forming apparatus in which a plurality of toner images of gradated pattern are formed on an image carrier, a quantity of toner deposited on each toner image is detected by an electrophotosensitive chip, and the image signal is corrected according to the result of detection to prevent degradation of the image such as dirt of image due to such causes as change with the lapse of time of a developer or changing in development characteristics because of effects by the surroundings or a low image density. Concretely, the conventional type of image forming apparatus as described above is disclosed, for instance, in Japanese Patent Laid Open Publication No. 260067/1985 disclosing "Electrophotography controlling method" or Japanese Patent Laid Open Publication No. 126462/1992 disclosing an "Image forming apparatus".

However, in an image forming apparatus in which a quantity of deposited toner is detected by using a conventional type of electrophotosensitive chip, a quantity of toner deposited on a image carrier becomes larger, and when the quantity exceeds a value specified previously, and output value from the electrophotosensitive chip becomes saturated and the sensitivity in detection becomes lower, so that measurement of a quantity of deposited toner on the image carrier becomes impossible when the quantity exceeds the prespecified value.

Also in the conventional type of image forming apparatus, as an image signal is corrected according to a quantity of deposited toner detected as described above, the image signal can be corrected, when a quantity of deposited toner is relatively lower, so that a desirable image density can be obtained, but when a quantity of deposited toner is relatively higher and accordingly a sensitivity of an electrophotosensitive chip is low, sometimes it is impossible to correct an image signal for obtaining a desired image density.

SUMMARY OF THE INVENTION

It is a first object of the present invention to make it possible to carry out measurement of a quantity of toner deposited on an image carrier.

Also it is a second object of the present invention to make it possible to correct an image signal irrespective of a quantity of toner deposited on the image carrier so that a desired image density can be obtained.

In order to achieve the first object as described above, the present invention provides a deposited toner quantity measuring method for measuring a quantity of deposited toner corresponding to a gradient of a gradated density pattern by irradiating a beam onto a visual image of a gradated image density pattern formed on an image carrier and detecting a quantity of reflected light with an electrophotosensitive chip; comprising steps of detecting a surface electric potential of an electrostatic latent image of the gradated density pattern, then measuring a quantity of reflected light from the visual image of the gradated density pattern, obtaining a relational equation between the surface electric potential and a quantity of deposited toner based on the surface electric potential in a range of a quantity of reflected light where sensitivity of the electrophotosensitive chip is good and a quantity of reflected light corresponding to the surface electric potential, computing a quantity of deposited toner from the quantity of reflected light in a range of a quantity of reflected light where sensitivity of the electrophotosensitive chip is high, or computing a quantity of deposited toner by using the surface electric potential of the electrostatic latent image of the gradated density pattern and a relational equation between a surface electric potential and a quantity of deposited toner.

In order to achieve the first object of the present invention, the present invention also provides an image forming apparatus having a gradated density pattern forming means for forming an electrostatic latent image of a gradated density pattern on an image carrier, a surface electric potential detecting means for detecting a surface electric potential of an electrostatic latent image of a gradated density pattern, a developing means for forming a visual image of a gradated density pattern on an image carrier, an electrophotosensitive means for detecting a quantity of reflected light from a visual image of a gradated density pattern formed on an image carrier, and an image forming means for forming an electrostatic latent image on an image carrier according to an image signal; comprising a first storage means for storing a result of detection by the surface electric potential detecting means, a second storage means for storing a result of detection by the electrophotosensitive means or a quantity of deposited toner obtained from the result of detection by the electrophotosensitive means, and a deposited toner quantity computing means for computing a quantity of deposited toner from a result of detection by the electrophotosensitive means in a range of a quantity of reflected light where the sensitivity of the electrophoto-sensitive means is high, or computing a quantity of deposited toner from a result of detection by the surface electric potential detecting means by obtaining a relational equation between a surface electric potential and a quantity of deposited toner based on the surface electric potential stored in the first storage means in a range of a quantity of reflected light where the sensitivity of the electrophotosensitive means is high and the quantity of deposited toner obtained from a quantity of reflected light corresponding to the surface electric potential stored in the second storage means and using the relational equation in a range of a quantity of reflected light where the sensitivity of the electrophotosensitive means becomes lower.

In order to achieve the second object of the present invention, the present invention also provides an image forming apparatus having a gradated density pattern forming means for forming an electrostatic latent image of a gradated density pattern on an image carrier, a surface electric potential detecting means for detecting a surface electric potential of an electrostatic latent image of a gradated density pattern, a developing means for forming a visual image of a gradated density pattern on an image carrier, an electrophotosensitive means for detecting a quantity of reflected light from a visual image of a gradated density pattern formed on an image carrier, and an image forming means for forming an electrostatic latent image on an image carrier according to an image signal; comprising a first storage means for storing a result of detection by the surface electric potential detecting means, a second storage means for storing a result of detection by the electrophotosensitive means or a quantity of deposited toner obtained from the result of detection by the electrophotosensitive means, a deposited toner quantity computing means for computing a quantity of deposited toner from a result of detection by the electrophotosensitive means in a range of a quantity of reflected light where the sensitivity of the electrophoto-sensitive means is high, or computing a quantity of deposited toner from a result of detection by the surface electric potential detecting means by obtaining a relational equation between a surface electric potential and a quantity of deposited toner based on the surface electric potential stored in the first storage means in a range of a quantity of reflected light where the sensitivity of the electrophotosensitive means is high and the quantity of deposited toner obtained from a quantity of reflected light corresponding to the surface electric potential stored in the second storage means and using the relational equation in a range of a quantity of reflected light where the sensitivity of the electrophotosensitive means becomes lower, and an image signal correcting means for estimating the developing characteristics from the quantity of deposited toner obtained by the toner deposition quantity computing means and a result of detection by the surface electric potential detecting means and correcting an image signal based on the estimated developing characteristics.

It should be noted that the range of a quantity of reflected light where the sensitivity of the electrophotosensitive chip or the electrophotosensitive means is good is preferably a range where a threshold value $V_p$ for detection by the electrophotosensitive means to a quantity of deposited toner on an image carrier is not less than a prespecified value $V_{pc}$. Or, the range of a quantity of reflected light where the sensitivity by the electrophotosensitive chip or the electrophotosensitive means is good is preferably a range where an absolute value $|V_p/\Delta(M/A)|$ of a change in a detected value $V_p$ detected by the electrophotosensitive means to a change $\Delta(M/A)$ of a quantity of deposited toner (M/A) on an image carrier is not less than a prespecified value $|V_p/\Delta(M/A)|_0$.

Also the relational expression between the surface electric potential described above and the quantity of deposited toner preferably consists of the following linear functional expression:

$(M/A) = \alpha \times V_S + \beta$ ($\alpha, \beta$: Constant)

Wherein $V_S$ is a surface electric potential and (M/A) is a quantity of deposited toner, or $(M/A) = \alpha \times (V_s - V_{DC}) + \beta$ ($\alpha, \beta$: Constant)

wherein $V_{DC}$ is a DC component of development bias.

Also an image forming apparatus according to the present invention preferably comprises a image forming conditions changing means for estimating the development characteristics from a quantity of deposited toner computed by the deposited toner quantity computing means and a result of the detection by the surface electric potential detecting means and changing the conditions of image carrier for forming an image depending on the estimated development characteristics.

In the deposited toner quantity measuring method according to the present invention as well as in the image forming apparatus according to the present invention, a quantity of deposited toner is computed from a quantity of reflected light in a range of a quantity of reflected light where the sensitivity of an electrophotosensitive chip is excellent, and is computed using a surface electric potential of an electrostatic latent image of a gradated density pattern and a relational expression between the surface electric potential and the quantity of deposited toner in a range of a quantity of reflected light where the sensitivity of the electrophotosensitive chip becomes lower.

Also the image forming apparatus according to the present invention estimates the development characteristics from a quantity of deposited toner obtained as described as above as well as from a result of detection by the surface electric potential detecting means and corrects an image signal from the estimated development characteristics.

As described above, the method of measuring a quantity of deposited toner according to the present invention makes it possible to measure a quantity of toner deposited on an image carrier even in a region of a quantity of deposited toner where the sensitivity of an electrophotosensitive chips is low, because the method comprises the steps of detecting a surface electric potential on an electrostatic latent image of a gradated density pattern, then measuring a quantity of reflected light from a visual image of the gradated density pattern, obtaining a relational expression between the surface electric potential and the quantity of deposited toner depending on a surface electric potential in a region of a quantity of reflected light where the sensitivity of an electrophotosensitive chip is high and a quantity of deposited toner obtained from the quantity of reflected light corresponding to the surface electric potential, and computing a quantity of deposited toner from a quantity of reflected light in a region of a quantity of reflected light where the sensitivity of the electrophotosensitive chip is high, or using a a surface electric potential on electrostatic latent image of a gradated density pattern as well as a relational expression between a surface electric potential and a quantity of deposited toner.

Also the image forming apparatus according to the present invention has a gradated density pattern forming means for forming an electrostatic latent image of a gradated density pattern on an image carrier, a surface electric potential detecting means for detecting a surface electric potential of an electrostatic latent image of a gradated density pattern, a developing means for forming a visual image of a gradated density pattern on an image carrier, an electrophotosensitive means for detecting a quantity of reflected light from a visual image of a gradated density pattern formed on an image carrier, and an image forming means for forming an electrostatic latent image on an image carrier according to an image signal, and also comprises a first storage means for storing a result of detection by the surface electric potential detecting means, a second storage means for storing a result of detection by the electrophotosensitive means or a quantity of deposited toner obtained from the result of detection by the electrophotosensitive means, and a deposited toner quantity computing means for computing a quantity of deposited toner from a result of detection by the electrophotosensitive means in a range of a quantity of reflected light where the sensitivity of the electrophoto-sensitive means is high, or computing a quantity of deposited toner from a result of detection by the surface electric potential detecting means by obtaining a relational equation between a surface electric potential and a quantity of deposited toner based on the surface electric potential stored in the first storage means in a range of a quantity of reflected light where the sensitivity of the electrophotosensitive means is high and the quantity of deposited toner obtained from a quantity of reflected light corresponding to the surface electric potential stored in the second storage means and using the relational equation in a range of a quantity of reflected light where the sensitivity of the electrophotosensitive means becomes lower, so that it is possible to measure a quantity of toner deposited on an image carrier even in a region of a large quantity of deposited toner where the sensitivity of an electrophotosensitive chip is small.

Also the image forming apparatus according to the present invention has a gradated density pattern forming means for forming an electrostatic latent image of a gradated density pattern on an image carrier, a surface electric potential detecting means for detecting a surface electric potential of an electrostatic latent image of a gradated density pattern, a developing means for forming a visual image of a gradated density pattern on an image carrier, an electrophotosensitive means for detecting a quantity of reflected light from a visual image of a gradated density pattern formed on an image carrier, and an image forming means for forming an electrostatic latent image on an image carrier according to an image signal, and also comprises a first storage means for storing a result of detection by the surface electric potential detecting means, a second storage means for storing a result of detection by the electrophotosensitive means or a quantity of deposited toner obtained from the result of detection by the electrophotosensitive means, a deposited toner quantity computing means for computing a quantity of deposited toner from a result of detection by the electrophotosensitive means in a range of a quantity of reflected light where the sensitivity of the electrophoto-sensitive means is high, or computing a quantity of deposited toner from a result of detection by the surface electric potential detecting means by obtaining a relational equation between a surface electric potential and a quantity of deposited toner based on the surface electric potential stored in the first storage means in a range of a quantity of reflected light where the sensitivity of the electrophotosensitive means is high and the quantity of deposited toner obtained from a quantity of reflected light corresponding to the surface electric potential stored in the second storage means and using the relational equation in a range of a quantity of reflected light where the sensitivity of the electrophotosensitive means becomes lower, and an image signal correcting means for estimating the developing characteristics from the quantity of deposited toner obtained by the toner deposition quantity computing means and a result of detection by the surface electric potential detecting means and correcting an image signal based on the estimated developing characteristics, so that not only an image signal corresponding to a small quantity of deposited toner but also that corresponding to a large quantity of deposited toner can be corrected, which makes it possible to obtained a desirable image density. Also it is possible to correct not only an image signal corresponding to small quantity of deposited toner but also that corresponding to a large quantity of deposited toner can be corrected to obtained a desired image density even if the development characteristics changes due elapse of time.

Other objects and features of this invention will become understood from the following description with reference to the accompanying drawings.

BRIEF DESCRIPTION OF THE DRAWINGS

FIG. 14 is a drawing illustrating a still different example of a processing for correcting the development characteristics as a function of elapse of time.

DESCRIPTION OF THE PREFERRED EMBODIMENTS

Detailed description is made hereinafter for an embodiment of the present invention wherein a method of measuring a quantity of deposited toner and an image forming apparatus each according to the present invention are applied in a copying apparatus with reference to the related drawings.

Figure 1:
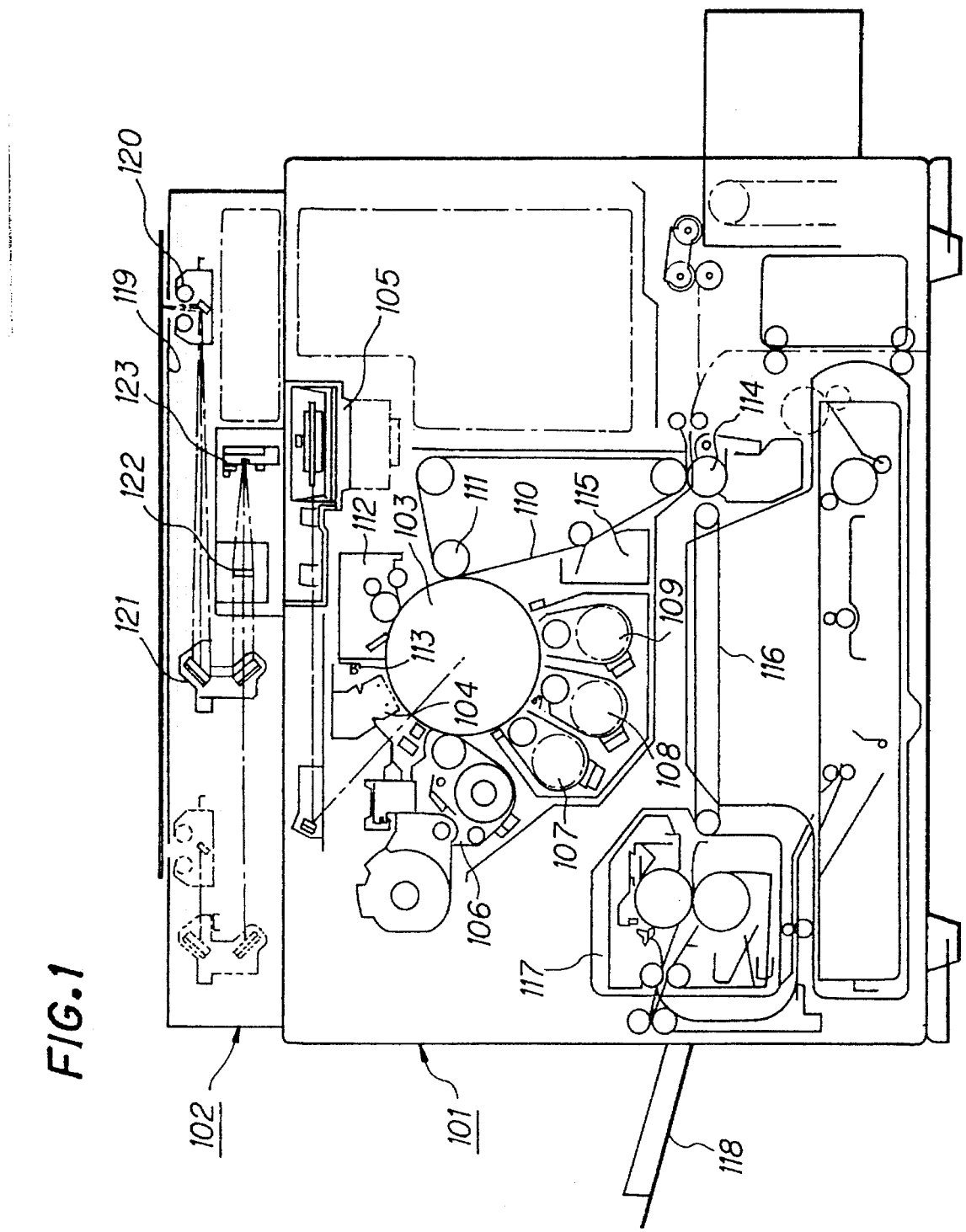
FIG. 1 is a view illustrating configuration of a copying apparatus in which a method of measuring a quantity of deposited toner as well as an image forming apparatus according to an embodiment of the present invention is applied.

In the drawings, FIG. 1 is a drawing illustrating configuration of a copying apparatus according to the present embodiment, and the copying apparatus largely comprises a printer 101 and a scanner 102.

The printer 101 includes a photosensitive drum 103 (OPC) which is an image carrier installed at the substantially central place thereof, an electrifying charger 104 which homogeneously electrifies the surface of the photosensitive drum 103, a laser optical system 105 which irradiates a semiconductor laser beam onto the surface of the photosensitive drum 103 homogeneously electrified as described above to form an electrostatic latent image, a black developing unit 106, a yellow developing unit 107, a magenta developing unit 108, a cyan developing unit 109, each of said developing units feeding toner for each color to the electrostatic latent image and executing toner development for each color, an intermediate transfer belt 110 for successively transferring toner images for each color formed on the photosensitive drum 103, a bias roller 111 which loads a voltage for transfer to the intermediate transfer belt 110, a cleaning unit 112 which removes toner remaining on the surface of the photosensitive drum 103 after transfer process, an electric charge removing unit 113 which removes an electric charge still remaining on the surface of the photosensitive drum 103 after transfer process, a transfer bias roller 114 which loads a voltage for transferring a toner image transferred on the intermediate transfer belt 110 to recording paper, a belt cleaning unit 115 for cleaning a toner image remaining on the intermediate transfer belt 110, a carrier belt 116 to carry recording paper separated from the intermediate transfer belt 110, a fixing unit 117 which fixes the toner image transferred to the recording paper by applying heat and a pressure thereto for fixing, and a paper ejecting tray 118 onto which the recording paper with the toner imaged fixed thereon is ejected.

The scanner 102 is located on the printer 101, as shown in this figure, and has a sheet contact glass 119 as an original mounting base, an exposure lamp 120 which irradiates a beam for scanning to the original on the contact glass 119, a reflection mirror 121 to introduce a reflected light from the original and an image-forming lens 122, and a CCD (Charge Coupled Device) 123 which is a photoelectric transfer chip which receives a reflected light introduced via the reflection mirror 121 and the image-forming lens 122 and converts the reflected light to an electric signal. It should be noted that the image signal converted to an electric signal by the CCD 123 is irradiated as a laser beam, via an image processing section (not shown) from a semiconductor laser in the laser optical system 105.

Figure 2:
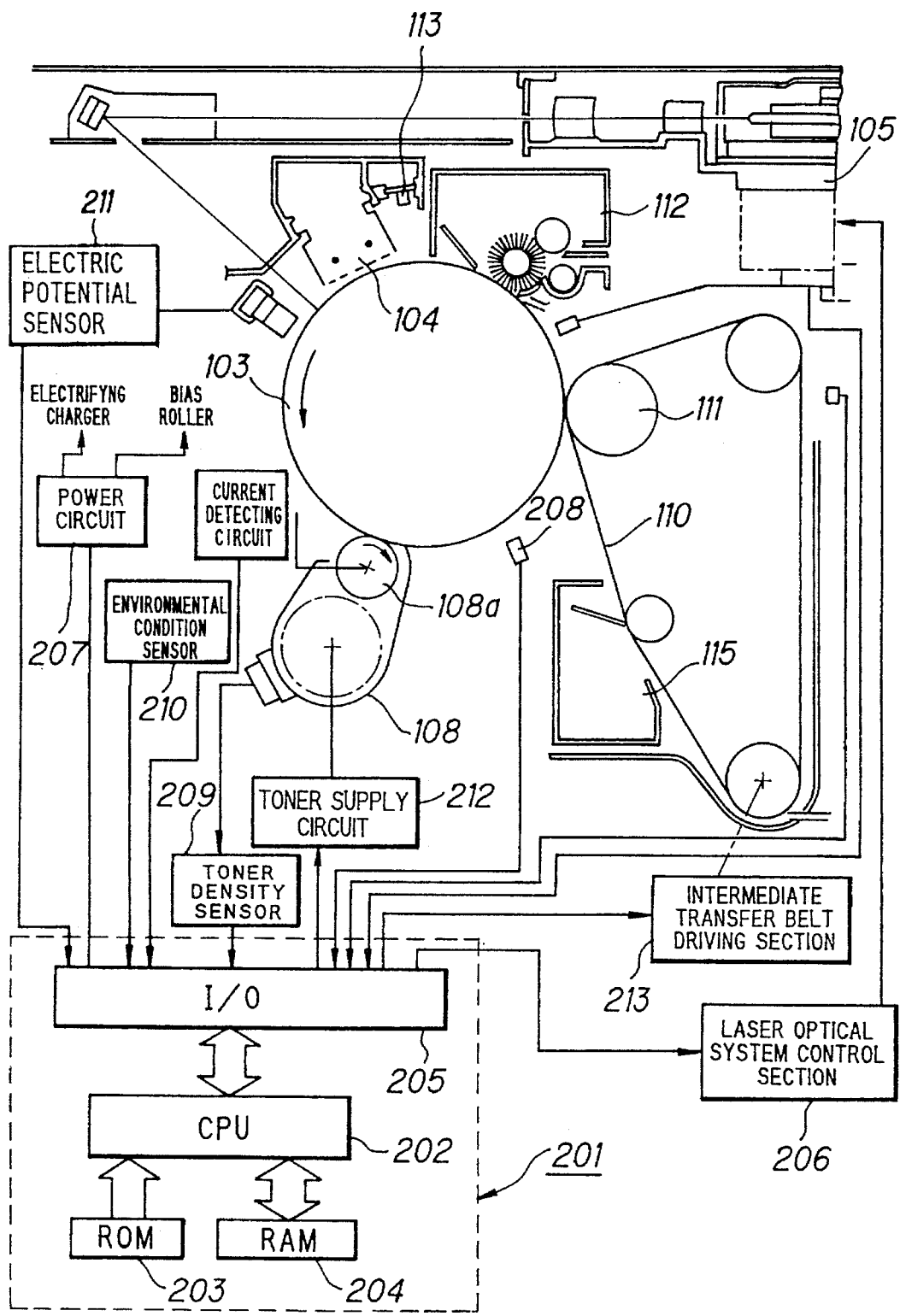
FIG. 2 is a view illustrating a control system incorporated in the copying apparatus according to the embodiment of the present invention.

FIG. 2 is a view illustrating a control system incorporated in the copying apparatus described above. This control system has a main controlling section 201. This main controlling section 201 comprises a CPU 202, a ROM 203 in which various types of data used in the CPU 202 and control programs are stored, a RAM 204 which temporally stores various types of data as a work memory, and an interface I/O 205 for executing communication or data transaction with the CPU 202 and each section described later.

Also to the main controlling section 201 are connected via the interface I/O 205 such units as a control section 206 for the laser optical system, a power circuit 207, a optical sensor 208, a toner density sensor 209, an environmental conditions sensor 210, a photosensitive element surface electric potential sensor 211, a toner supply circuit 212, and an intermediate transfer belt driving section 213.

The laser optical system controlling section 206 controls laser output from the laser optical system 105. The power circuit 207 supplies a specified level of discharge voltage for electrification to the electrifying charger 104, supplies a development bias corresponding to a specified level of voltage to developing sleeves of the developing units 106 to 109 (for instance, 108a in the figure), and also applies a specified level of transfer voltage to the bias roller 111 and the transfer bias roller 114.

The optical sensor 208 comprises a light emitting chip such as a light emitting diode and a light receiving chip such as a photosensor, and detects a quantity of toner deposited in a toner image of a gradated density pattern (namely, a visual image of a gradated density pattern) formed on the photosensitive drum 103 as well as a quantity of toner deposited on the ground of the photosensitive drum 103 for each color. The signal detected and outputted from this optical sensor 208 is supplied as input to the main controlling section 201, where the signal is used for such purposes as detection of a quantity of detected toner and correction of image signals. Also the signal detected and outputted by the optical sensor 208 is loaded to a photoelectric control section not shown in the figure, and the photoelectric sensor control section computes a ratio of a quantity of toner deposited on a toner image of a gradated density pattern vs a quantity of toner deposited on the ground of the photosensitive drum, detects change in the image density by comparing the ratio value to the reference value, and correct a control value for the toner density sensor 209.

The toner density sensor 209 detects a toner density based on a change in permeability of a developer existing in the developing units 106 to 109, compares the toner density value to the reference value, and, if the toner density value is lower than a prespecified value indicating that a quantity of toner is short, outputs a toner feed signal having a strength corresponding to the shortage. The surface electric potential sensor 211 detects a surface electric potential of the photosensitive drum 103 which is an image carrier, while the intermediate transfer belt driving section 213 controls movement of the intermediate transfer belt 110. The toner supply circuit 212 controls a quantity of toner to be supplied to the developing units 106 to 109 in response to the toner feed signal from the toner density sensor 209.

Figure 3:
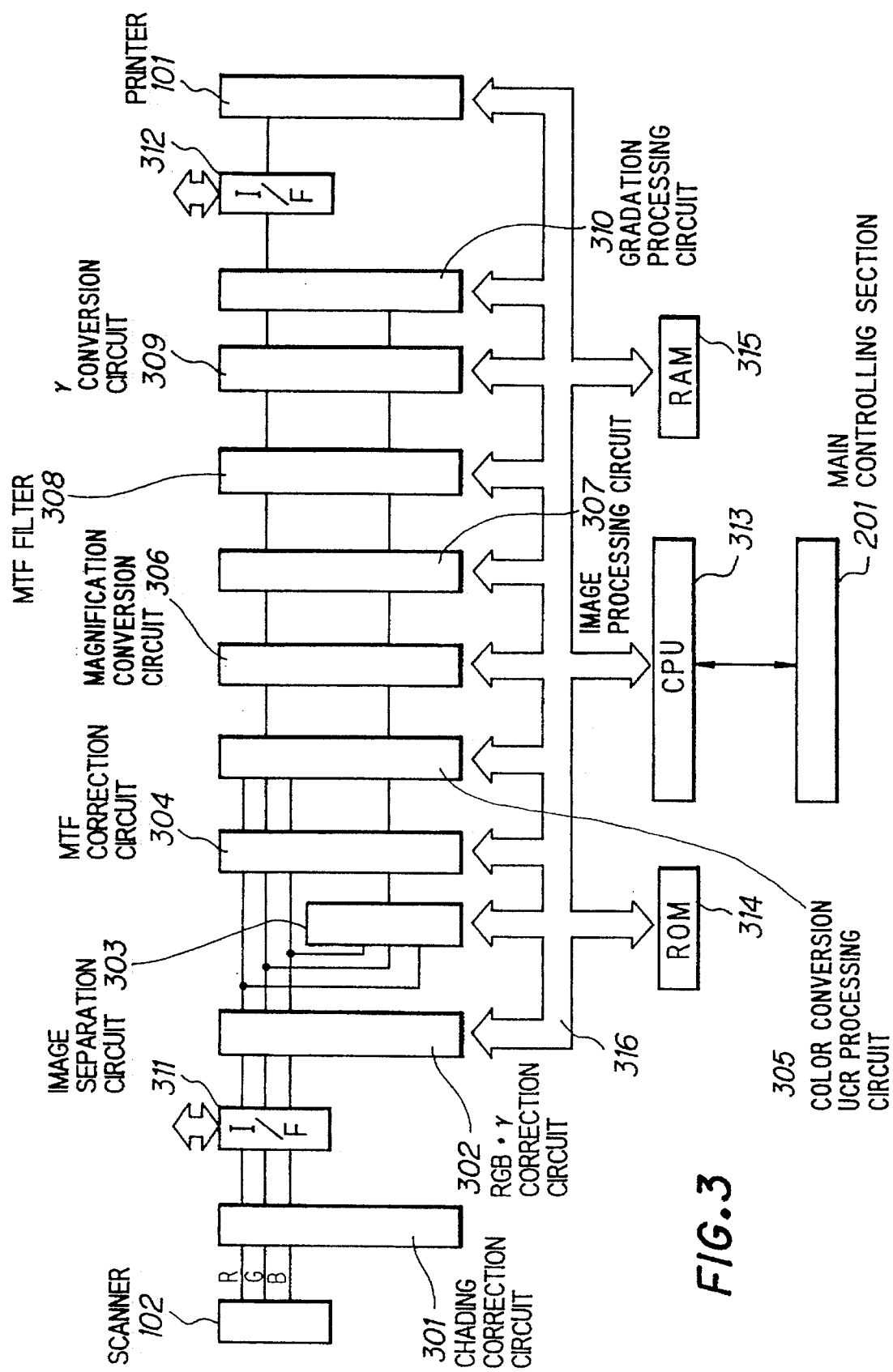
FIG. 3 is a block diagram illustrating configuration of an image processing section of the copying apparatus according to the embodiment of the present invention.

Next description is made below for the image processing section with reference to FIG. 3. The image processing section inputs an image signal read by the scanner 102, executes various types of image processing to the image signal, and outputs the image signal to the printer 101 (more concretely, to the laser optical system control section 206). The image processing section comprise a shading correction circuit 301 which corrects nonuniformity of image pick-up chips (CCD 123) or that in illumination from a light source, an RGB×γ correction circuit 302 which converts a signal read from the scanner 102 (reflactance data) to brightness data, an image separation circuit 303 for distinguishing a character section from a photograph section and a colored section from a non-colored section, an MTF correction circuit 304 for correcting degradation of the MTF characteristics in an input system (especially in a high frequency wave region), a color conversion UCR processing circuit 305 for executing a UCR processing to apply black in a section where 3 colors of yellow, magenta and cyan are overlapped, a magnification conversion circuit 306 for execution of variation in the vertical and lateral directions, an image processing circuit 307 which executes such a processing as repetition, an MTF filter 308 which changes the frequency characteristics of an image signal such as an emphasis on edge or smoothing so that a sharp or a soft image can be obtained according to a user's preference, a γ conversion circuit 309 which corrects an image signal according to the characteristics of the printer 101, a gradation processing circuit 310 which executes a dither processing or a pattern processing, interfaces (I/F) 311 and 312 for processing an image signal read from the scanner 102 in an external image processing device or for output of an image signal from an external image processing device by the printer 101, a CPU 313 controlling each of the sections described above, a ROM 314, and a RAM 315. The reference numeral 316 denotes a bus. Also the CPU 313 is connected via a serial interface (not shown) to the main controlling section 201, and commands from operating sections not shown herein are sent via the main controlling section 201 to the CPU 313.

Figure 4:
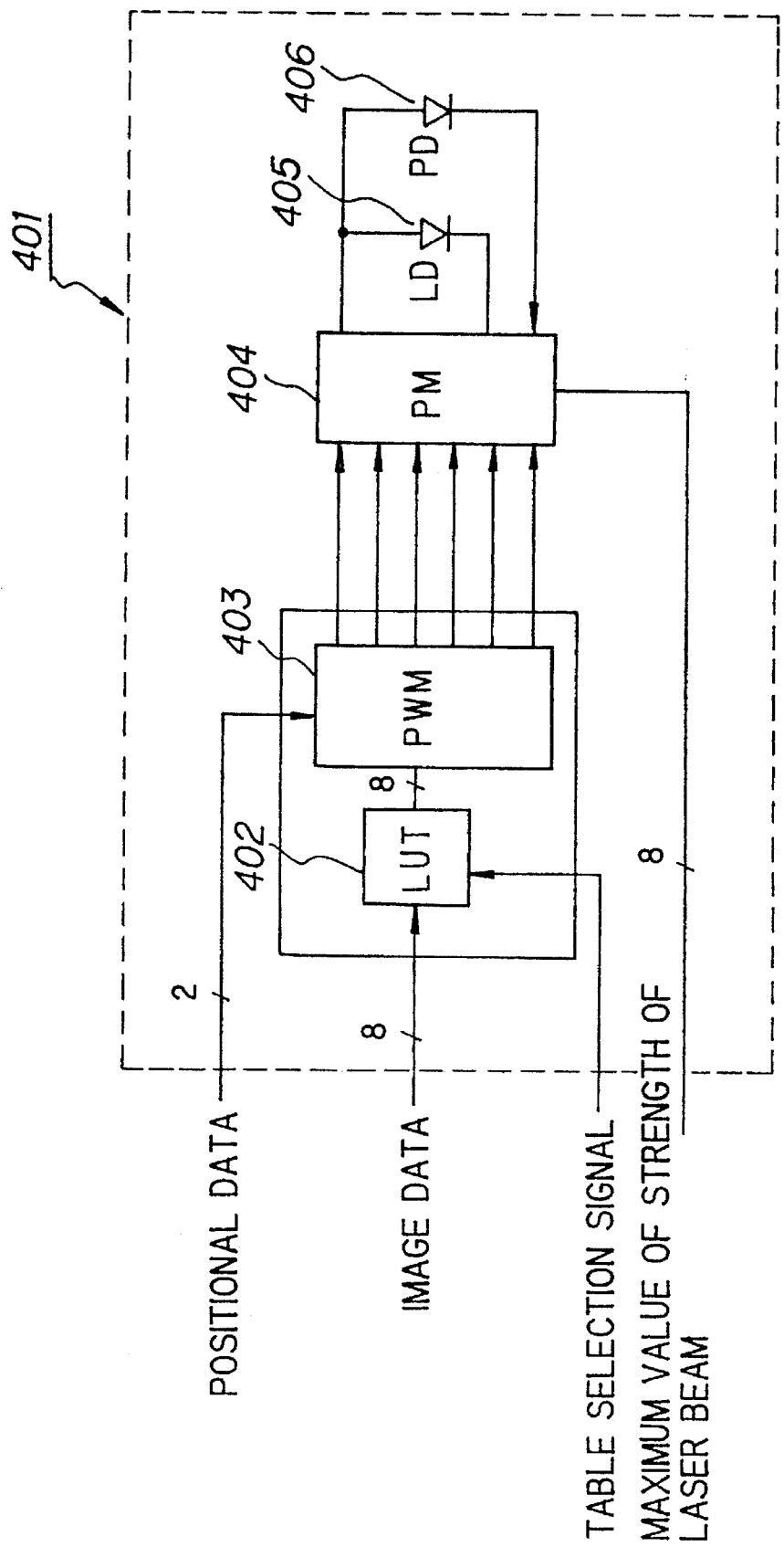
FIG. 4 is a block diagram of a laser modulation circuit incorporated in the laser optical system.

FIG. 4 is a block diagram of a laser modulation circuit 401 installed in the laser optical system 105. In this laser modulation circuit 401, a write frequency is 18.6 MHz, while a scanning time for one pixel is 53.8 nsec. γ conversion of an 8-bit image signal (image data) can be executed with a LUT (look-up table) 402. Also a pulse width of the image signal is converted to a 4-valued pulse width based on the upper 2 bits of the 8-bit image signal in a pulse width modulation circuit (PWM) 403, 64-valued power modulation is executed according to the lower 6 bits of the 8-bit image signal in the power modulation circuit (PM) 404, and light emission is executed by a laser diode (LD) 405 according to the modulated signal. A photo detector (PD) 406 monitors the strength of the emitted light and executes correction for each dot. The maximum value of the strength of the laser beam can be changed to 8 bits (256 stages) independently from the image signal.

Next description is made for operations in:

(1) the processing A for detection of a quantity of deposited toner, (2) the processing B for detection of a quantity of deposited toner, and (3) in the processing for correcting the development characteristics as a function of elapsed time, according to the order described above.

(1) Processing A for detection of a quantity of deposited toner

Figure 5:
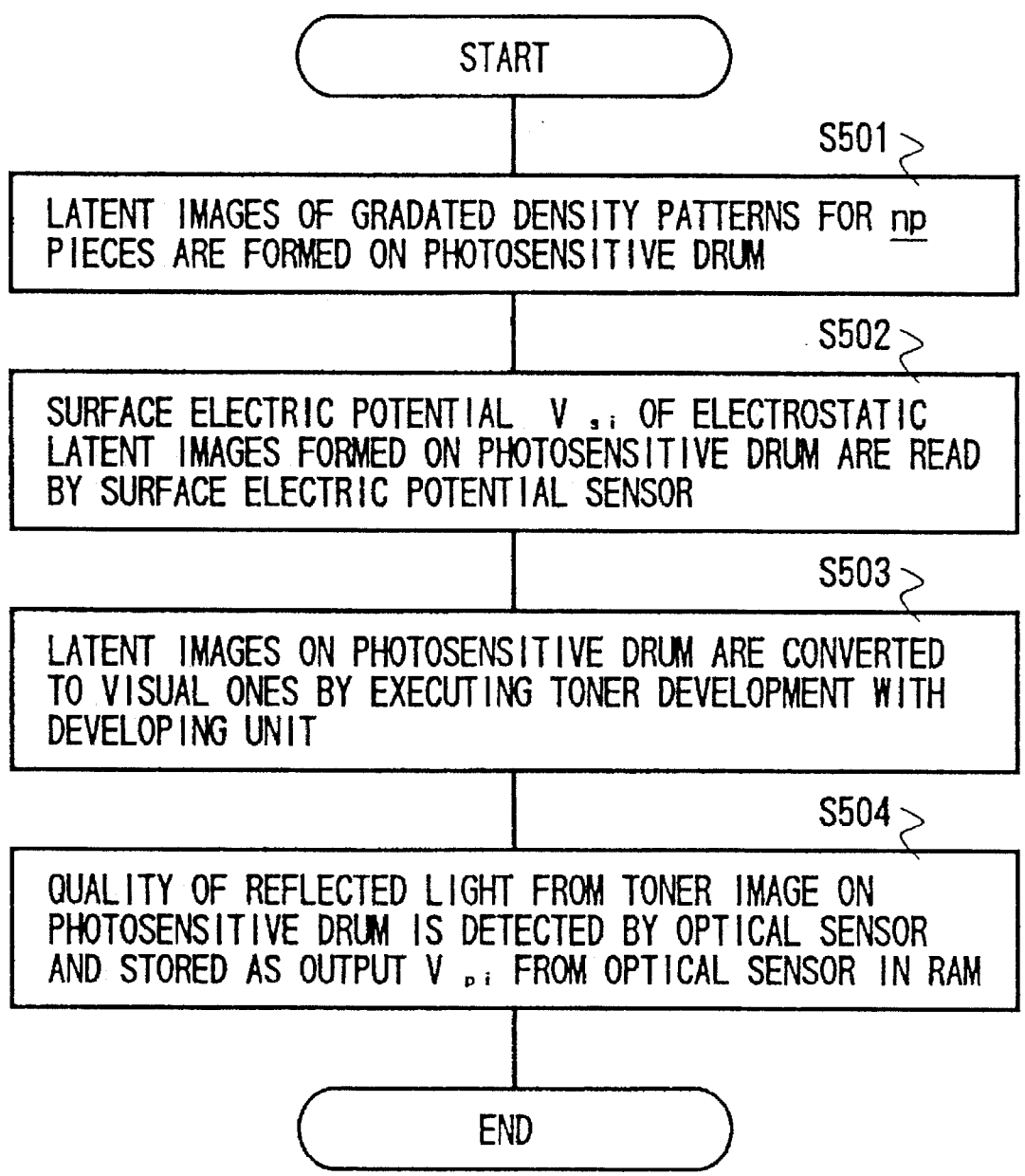
FIG. 5 is a flow chart illustrating a processing A for detection of a quantity of deposited toner according to the embodiment of the present invention.
Figure 6:
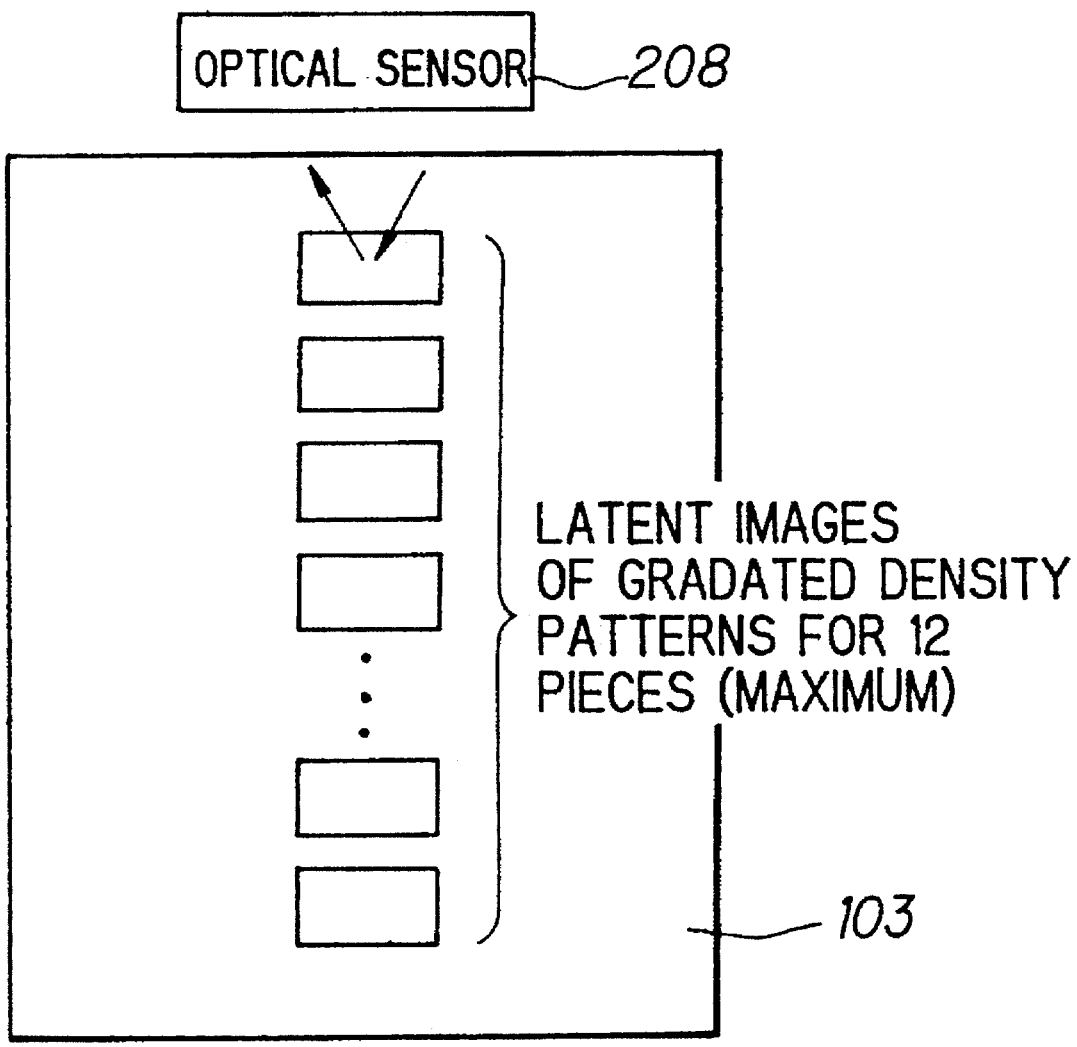
FIG. 6 is a view illustrating a gradated density pattern.

FIG. 5 is a flow chart illustrating the processing A for detection of a quantity of deposited toner according to the embodiment of the present invention. At first, as shown in FIG. 6, latent images for np pieces (12 pieces in this embodiment) are formed on the photosensitive drum 103 (S501), and surface electric potential $V_{Si}$ (i=1,2, ... np) of electrostatic latent images (gradated density patterns) formed on the photosensitive drum 103 are read by the surface electric potential sensor 211 and stored in the RAM 204 (S502).

Then the latent images on the photosensitive drum 103 are converted to visual ones by executing toner development with the developing unit 106 (S503) and a quantity of reflected light from a toner image on the photosensitive drum 103 is detected by the optical sensor 208 and stored as output $V_{pi}$ (i=1,2, ... np) from the optical sensor in the RAM 204 (S504).

Laser output used for detection in this step is , for instance, a value (hexadecimal number) of an image signal such as 00 (H), 10 (H), 20 (H), 30 (H), 40 (H), 50 (H), 60 (H), 70 (H), 90 (H), B0 (H), D0 (H), and FF (H).

A pattern which underwent a dither processing is used as a gradated density pattern like in actual image formation. Concretely, a sum of image signals for 2 pixels in the main scanning direction is divided to two portions according to a value of each signal as described below. Namely, assuming that an image signal for a first pixel is $N_1$, an image signal for a second pixel is $N_2$, an image signal for the first pixel after processing is $N_{11}$, and an image signal for the second pixel after processing is $N_{22}$, the sum is divided as follows.

In case of $N_1+N_2<=FF$ (H)
$N_{11}=N_1+N_2$
$N_{22}=0$ and in case of $N_1+N_2>FF$ (H)
$N_{11}=FF$ (H)
$N_{12}=N_1+N_2-FF$ (H)

Figure 7:
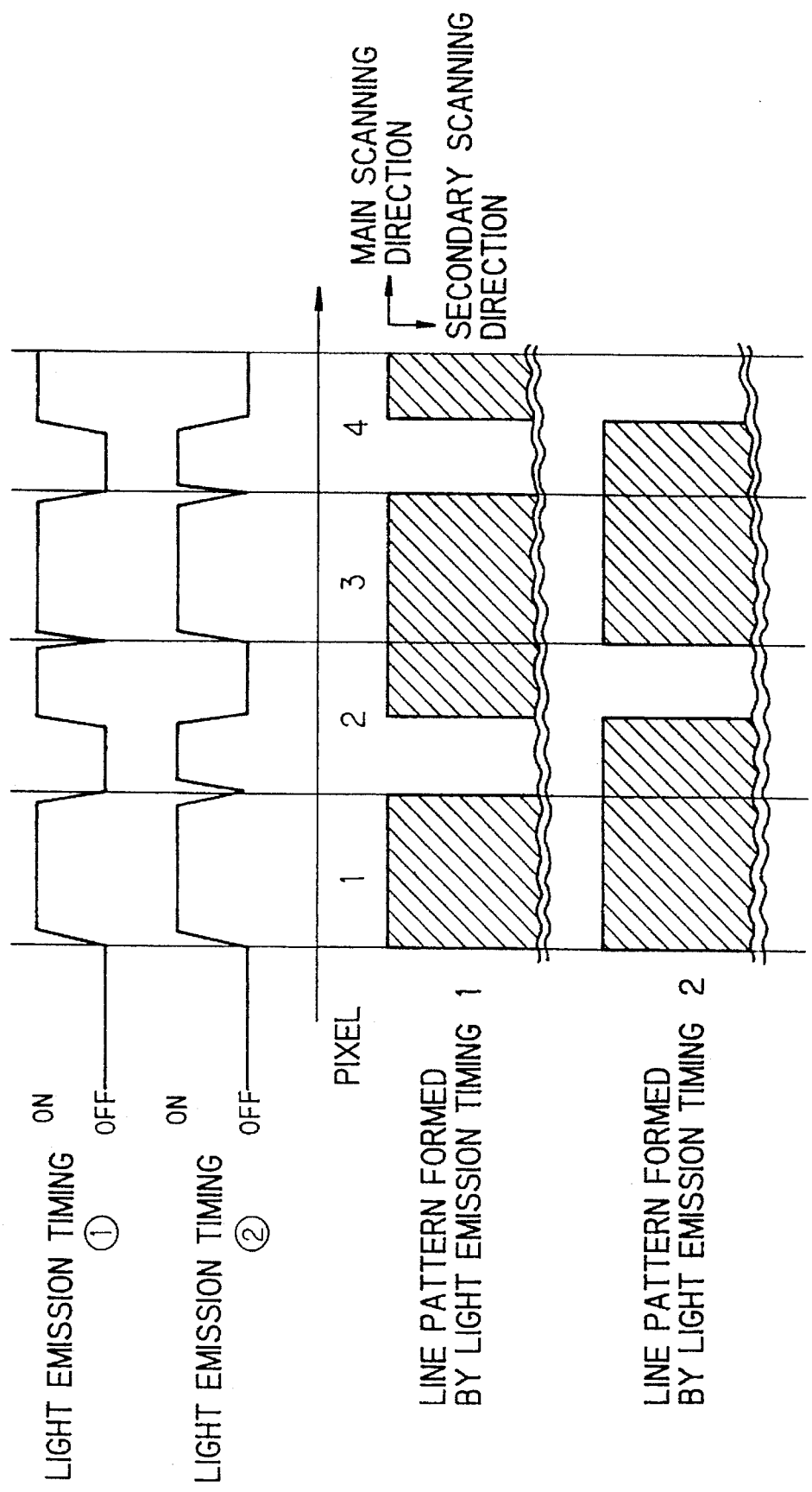
FIG. 7 is a timing chart illustrating a timing for start of emission of a laser beam.

As for the timing for start of emission of a laser beam for an image signal to which a dither processing was applied as described above, exposure distributions for the two pixels becomes closer as indicated by the light emission timing ① and the light emission timing ② in FIG. 7. By using a pulse width modulation system, this pattern is converted to a line pattern which is continuous in the secondary scanning direction as shown by a line pattern in FIG. 7, and a width of the line pattern can form an electrostatic latent image which is substantially proportional to a sum of $N_1$ and $N_2$.

Figure 8:
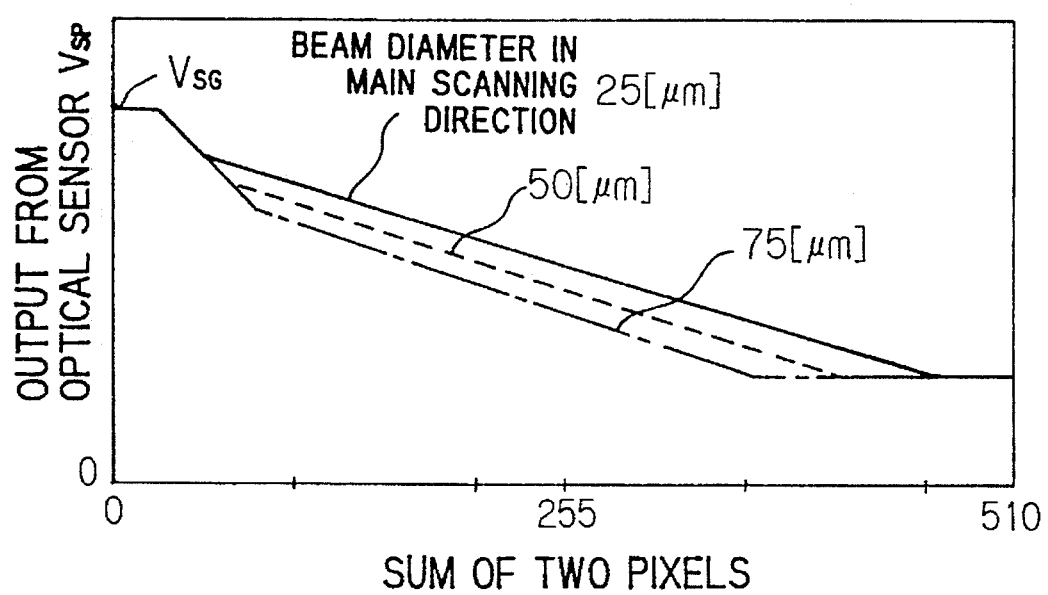
FIG. 8 is a graph illustrating the linearity of the optical sensor to an image signal.

For this reason, also output from the optical sensor 208 has an advantage that linearity of output to an image signal is excellent as shown in FIG. 8.

This effect varies according to a beam diameter of a laser beam, and a beam diameter in the main scanning direction (defined as a width when a beam strength in the static state is attenuated to $1/e^2$ of the maximum value) is not more than 90%, and preferably 80%. Concretely, a preferable beam diameter under the conditions of 400 DPI and 63.5 μm for one pixel is not more than 50 μm.

(2) Processing B for detection of a quantity of deposited toner

Figure 9:
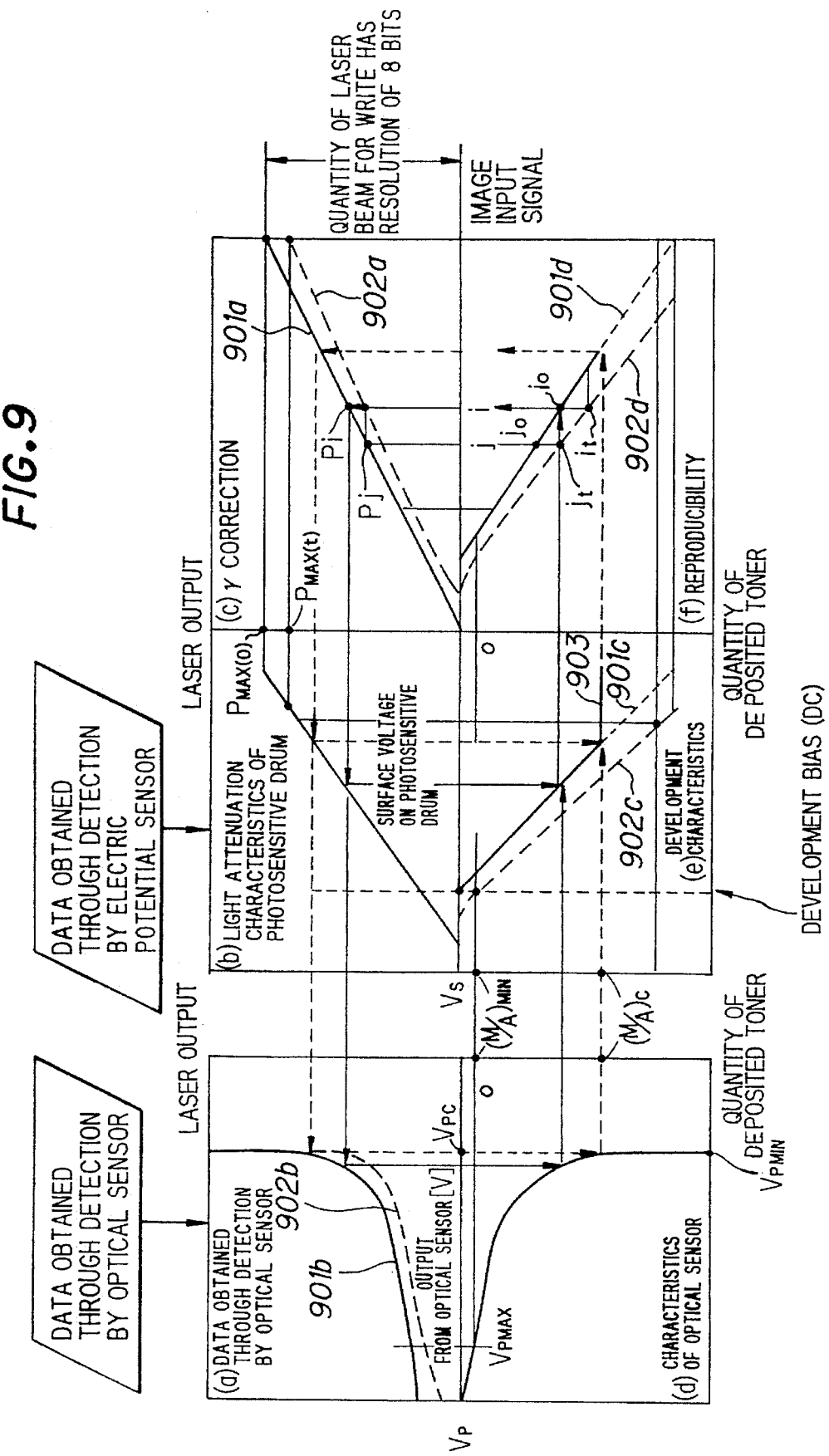
FIG. 9 is a view illustrating a processing B for detecting a quantity of deposited toner according to the embodiment of the present invention.
Figure 10:
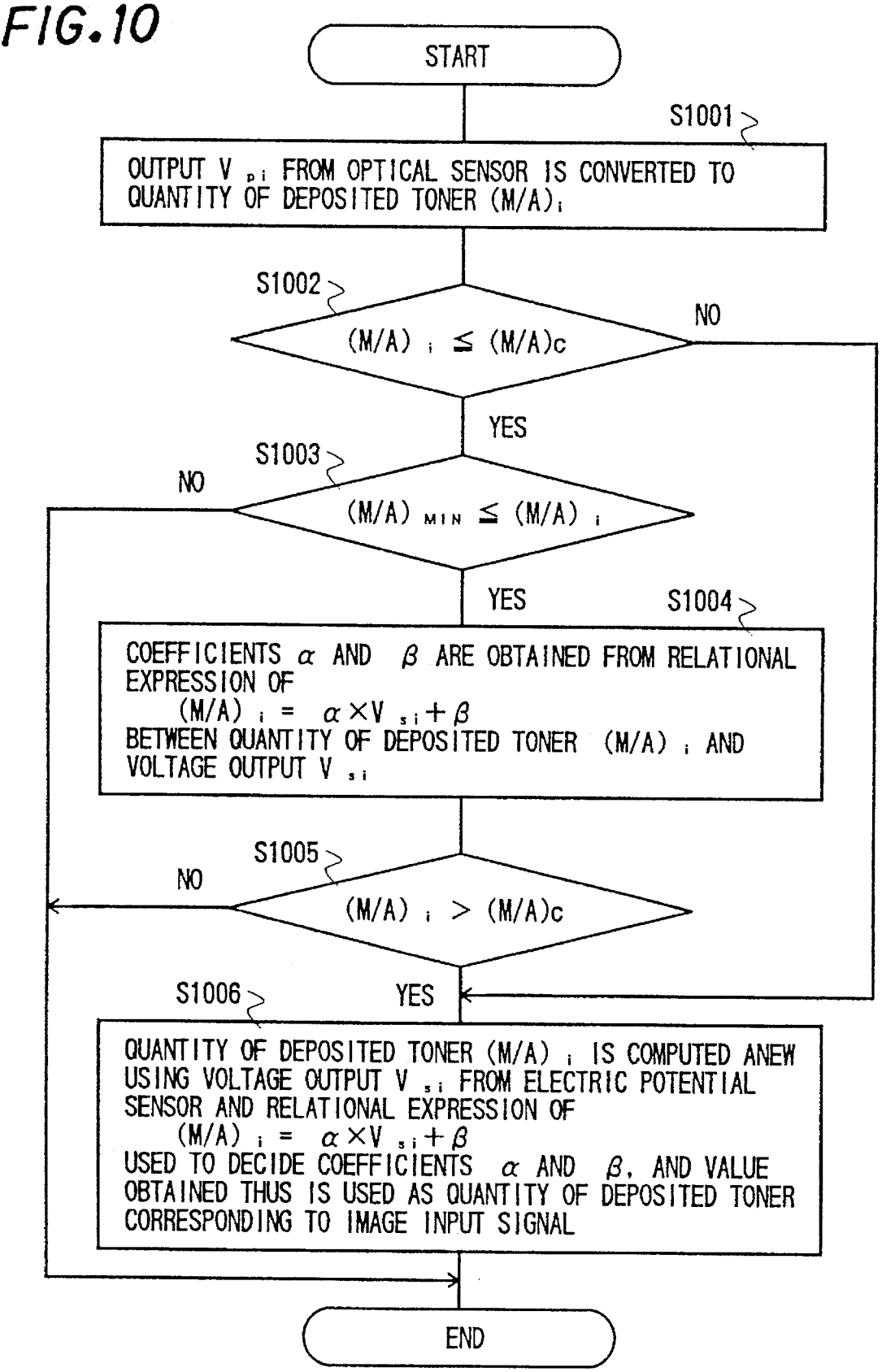
FIG. 10 is a flow chart of a processing B for detecting a quantity of deposited toner according to the embodiment of the present invention.

Next description is made for the processing B for detection of a quantity of deposited toner with reference to FIG. 9 and FIG. 10. This processing B for detection of deposited toner is executed in succession to the processing A for detection of a quantity of deposited toner. FIG. 9 shows 6 graphs (a) to (f).

Graph (a) shows data obtained through detection by the optical sensor plotted with the vertical axis indicating laser output and the horizontal axis indicating output from the optical sensor 208. Data shown by this graph is obtained by forming electrostatic latent images of np pieces of gradated density pattern on the photosensitive drum 103, executing toner development, and detecting a quantity of reflected light from the toner image with the optical sensor 208. In other words, the data is those stored in the RAM 204 in S504 shown in FIG. 5.

Graph (b) shows the light attenuation characteristics of the photosensitive element plotted with the vertical axis indicating laser output and the horizontal axis indicating a surface electric potential on the photosensitive drum 103. Data shown by this graph is obtained by forming electrostatic latent images for np pieces of gradated density pattern and measuring the surface electric potential on the electrostatis latent values with the electric potential sensor 211. In other words, the data is those stored in the RAM 204 in S502 shown in FIG. 5.

Graph (c) shows γ correction plotted with the vertical axis indicating laser output and the horizontal axis indicating an image input signal (which is proportional to a darkness of the original image). Herein, the image input signal has a resolution of 8 bits (256 grades), and also a quantity of laser beam for write has a resolution of 8 (to 10) bits between the minimum value and the maximum value of the laser output.

Graph (d) shows the characteristics of an optical sensor plotted with the vertical axis indicating a quantity of deposited toner on the photosensitive drum 103 and the horizontal axis indicating output from the optical sensor 208. The characteristics varies according to such conditions as a type of sensor to be used, a angle for attaching the sensor, and a distance thereof from the photosensitive drum 103, but the characteristics is known previously and substantially constant.

Graph (e) shows the development characteristics (in other words, a relation between a surface electric potential and a quantity of deposited toner) plotted with the vertical axis indicating a quantity of toner deposited on the photosensitive drum 103 and the horizontal axis indicating the surface electric potential on the photosensitive drum 103.

Graph (f) shows a relation between an image input signal and a quantity of toner deposited on the photosensitive drum 103 (reproducibility) plotted with the vertical axis indicating a quantity of deposited toner and the horizontal axis indicating an image input signal (which is proportional to a darkness of the original image). Using the graph (d), output $V_{Pi}$ from the optical sensor is converted to a quantity of toner deposited on the photosensitive drum 103 $(M/A)_i$ [mg/cm$^2$] (i=1,2, ... np). Concretely a quantity of deposited toner can be obtained as described below.

A quantity of reflected light from a toner image formed on the photosensitive drum 103 is detected by the optical sensor 208 and sent as a detection signal to the main controlling section 201. Assuming that $V_{SP}$ and $V_{SG}$ are output for a section with toner deposited thereon in a gradated density pattern and output from the ground thereof respectively each provided as output from the optical sensor 208, a quantity of deposited toner $m_1$ [g/cm$^2$] is computed through the following equations:

$m_1 = -\ln(V_{SP}/V_{SG})/\lambda$ $\lambda = -6.0 \times 10^3$ [cm$^2$/g]

wherein $\lambda$ is a constant decided by the optical sensor 208 and the toner and the above value indicates black toner. The values for yellow, cyan and magenta can also be converted in the same way. Instead of the above calculation, a look-up table may be prepared previously for converting a value to a color by referring to the look-up table.

A relation between a surface electric potential $V_{Si}$ on the photosensitive drum 103 and a quantity of toner deposited on the photosensitive drum 103 $(M/A)_i$ is obtained in the way as described above, and a solid line 903 in graph (e) as the development characteristics.

However, as shown by graph (d), when a quantity of deposited toner is equal to or larger than a specified quantity of deposited toner $((M/A) >= (M/A)c)$, output from the optical sensor 208 indicates a constant value $V_{PMIN}$, so that a surface electric potential on the photosensitive drum 103 becomes lower to an image input signal higher than that indicated by n in graph (c) in actual operation as shown by graph (b), and irrespective of change in a quantity (M/A) of deposited toner, a quantity of toner deposited on the photosensitive drum 103 is always indicated by a constant value (M/A) c. For this reason, even if the development characteristics corresponding to an actual quantity of deposited toner is as indicated by the broken line 901C in graph (e), the development characteristics obtained from a result of detection by the optical sensor 208 is expressed by the solid line 903 in the graph, and a different between the actual value (as indicated by the broken line 901c) and the detected value (as indicated by the solid line 903) is generated.

So in this embodiment according to present invention, in a region of a quantity of deposited toner where output from the optical sensor 208 is expressed with a constant value $V_{PMIN}$ $((M/A) >= (M/A) c)$, in other words, in a region of a quantity of reflected light where the sensitivity of the optical sensor 208 becomes lower, detection of a quantity of deposited toner is executed in the following way to compensate the difference between an actual quantity of deposited toner and a quantity of deposited toner detected by the optical sensor 208.

At first, when output $V_{Pi}$ from the optical sensor 208 to the image input signal i is not less than a specified value $V_{PC}$ ($V_{PC} >= V_{PMIN}$), in other words, when a quantity of reflected light is in a region where the sensitivity of the optical sensor 208 is excellent, a relational expression between output $V_{Si}$ from the electric potential sensor 211 and a quantity of deposited toner $(M/A)_i$ is obtained from output $V_{Pi}$ from the optical sensor 208. Herein, the following linear function:

$(M/A)_i = \alpha \times V_{Si} + \beta \, (V_{Pi} >= V_{PC})$ is used. Or, assuming that a DC component of development bias is $V_{DC}$, the following relational expression for a linear relation:

$(M/A)_i = \alpha \times (V_{Si} - V_{DC}) + \beta \, (V_{Pi} >= V_{PC})$ is used.

In the expressions above, $\alpha$ and $\beta$ are constants and are decided depending on the values of output $V_{Si}$ and $(M/A)_i$ using such a method as a minimum square method.

Also the same effect can be obtained by realizing a quantity of deposited toner satisfying the expression of ($(M/A)_i) <= (M/A)c$) assuming that $(M/A)c$ is a quantity of toner deposited on the photosensitive drum 103 when output $V_{Pi}$ from the optical sensor 208 is $V_{PC}$.

When a quantity of deposited toner on the photosensitive drum 103 is lower than a specified value $(M/A)_{MIN}$, sometimes a difference between the quantity of deposited toner and the surface electric potential on the photosensitive drum 103 may become larger because of the linear relation between the two factors. For this reason, the coefficients $\alpha$ and $\beta$ for the relational expression described above are decided depending on a result of detection of the quantity of toner deposited on the photosensitive drum 103 satisfying the expression of $(M/A)_{MIN} <= (M/A)_i <= (M/A)c$.

Although a quantity of deposited toner is used as a factor in this embodiment, the coefficients $\alpha$ and $\beta$ may be decided depending on a quantity of deposited toner satisfying the expression of $V_{PC} <= V_p <= V_{PMAX}$ using the output $V_{PMAX}$ from the optical sensor 208 corresponding to $(M/A)_{MIN}$.

Next description is made for operations in a concrete processing with reference to a flow chart of the processing B for detection of a quantity of deposited toner shown in FIG. 10. At first, output $V_{Pi}$ from the optical sensor 208 stored in the RAM 204 is converted to a quantity of deposited toner $(M/A)_i$ (S1001), determination as to whether the expression of $(M/A)_i <= (M/A)c$ or not is executed, and program control goes to S1006 if $(M/A)_i$ is not equal to nor smaller than $(M/A)c$ (in other words, a quantity of reflected light is in a region where the sensitivity of the optical sensor 208 goes lower), or to S1003 if $(M/A)_i$ is equal to or smaller than $(M/A)c$ (in other words, if a quantity of reflected light is in a region where the sensitivity of the optical sensor 208 is good) (S1002).

Then in S1003, determination as to whether $(M/A)_{MIN}$ is equal to or smaller than $(M/A)_i$ or not is executed, and the processing is terminated if $(M/A)_{MIN}$ is not equal to nor smaller than $(M/A)_i$. If (M/A)MIN is equal to or smaller than $(M/A)_i$, the coefficients $\alpha$ and $\beta$ are obtained from the relational expression of $(M/A)_i = \alpha \times V_{Si} + \beta$ between the quantity of deposited toner $(M/A)_i$ and electric potential output $V_{Si}$ (S1004). Also the quantity of deposited toner $(M/A)_i$ then is regarded as a quantity of deposited toner corresponding to the image input signal i.

Then, determination as to whether $(M/A)_i$ is larger than $(M/A)c$ or not is executed, and the processing is terminated if $(M/A)_i$ is not larger than $(M/A)c$ (S1005). If $(M/A)_i$ is larger than $(M/A)c$, as the quantity of deposited toner is in a region where the sensitivity of the optical sensor 208 goes lower, a quantity of deposited toner $(M/A)_i$ is computed anew using the electric potential output $V_{Si}$ from the electric potential sensor 211 and the relational expression of $(M/A)_i = \alpha \times V_{Si} + \beta$ used to decide the coefficients $\alpha$ and $\beta$ in S1004, and the value obtained thus is used as a quantity of deposited toner corresponding to the image input signal i (S1006).

With the processing B for detection of a quantity of deposited toner described above, it is possible to correct the quantity of deposited toner obtained from a result of detection by the optical sensor 208 (as indicated by the solid line 903) according to the value obtained by using the relational expression (which substantially coincides with the value indicated by the broken line 901c). In other words, it is possible to obtain a value close to a quantity of actually deposited toner through measurement by using a surface electric potential of an electrostatic latent image of a gradated density pattern and a relational expression between a surface electric potential and a quantity of deposited toner even if a quantity of deposited toner is in a region where the sensitivity of the optical sensor 208 becomes lower. The reproducibility as indicated by the straight line 901d in graph (f) can be obtained from the development characteristics in graph (c) and an image input signal.

Figure 11:
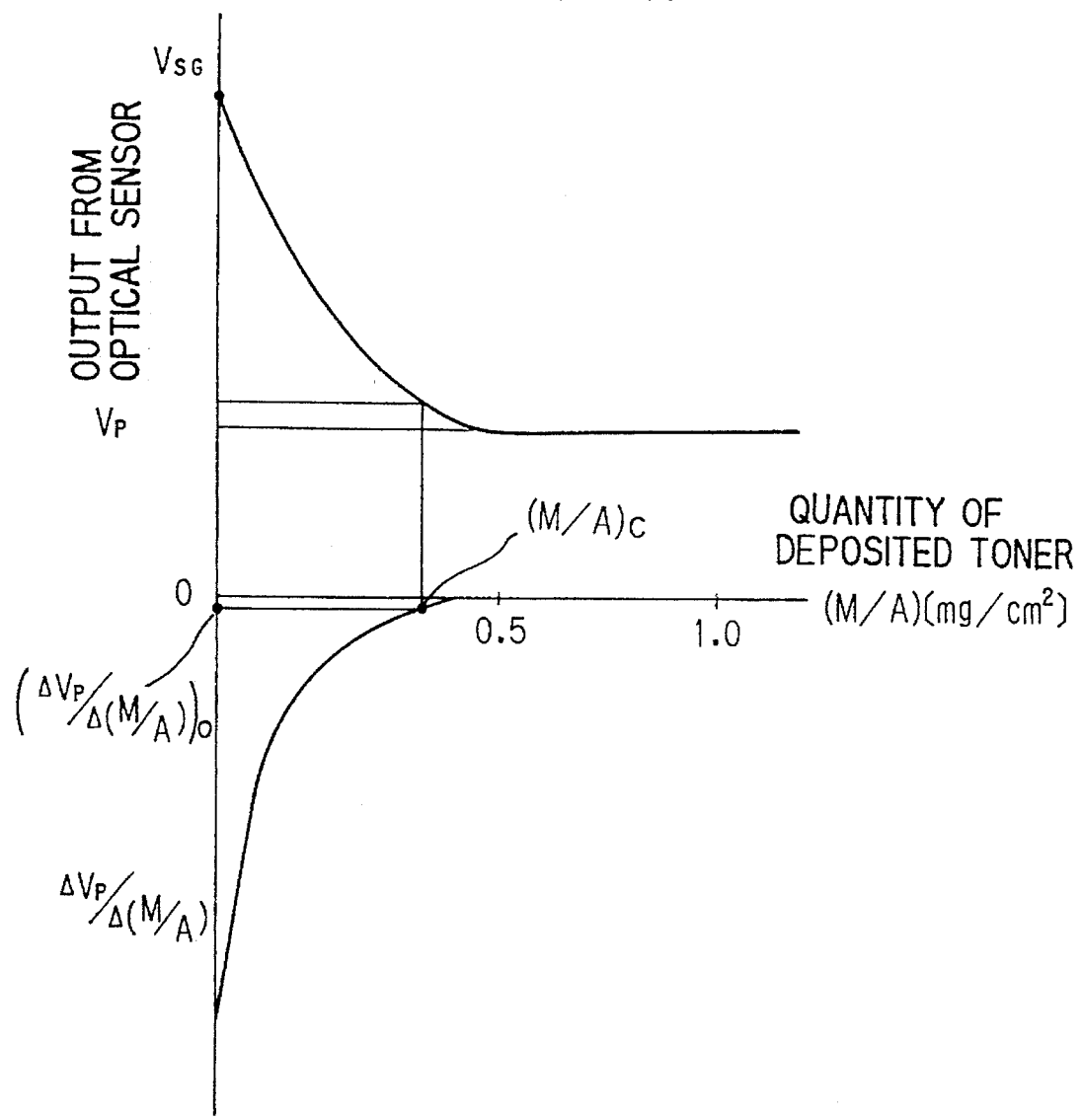
FIG. 11 is a graph illustrating a case where an absolute value of $|\Delta V_p/\Delta(M/A)|$ for a variation in output $V_p$ from the optical sensor corresponding to a variation $\Delta$ (M/A) in a quantity of deposited toner.

Also in this embodiment, determination as to whether output from the optical sensor 208 is larger than a specified value $V_{Pc}$ or not is executed, and the result is used to make a determination whether a quantity of deposited toner may be used or not, but as shown in FIG. 11, the same processing as that described above can be carried out by assuming that a quantity of toner deposited on the photosensitive drum 103, when an absolute value $|V_p/\Delta(M/A)|$ of a variation in output $V_P$ from the optical sensor 208 corresponding to a variation $\Delta(M/A)$ in a quantity of deposited toner detected by the optical sensor 208 is equal to a specified value $|\Delta V_p/\Delta(M/A)|_0$, is (M/A)c and output from the optical sensor 208 then is $V_{PC}$.

In this case, a region of a quantity of deposited toner satisfying the condition that $|V_p/(M/A)|$ is equal to or larger than $|\Delta V_p/\Delta(M/A)|_0$ corresponds to a region where $(M/A)_i$ is equal to or smaller than (M/C)c, and also the region where $|\Delta V_p/\Delta(M/A)|$ is smaller than $|\Delta V_p/\Delta(M/A)|_0$ corresponds to the region where $(M/A)_i$ is larger than (M/C)c.

(3) Processing for correcting the development characteristics as a function of elapsed time Next description is made for a processing for correcting the development characteristics to be executed when the development characteristics changed in a specified time after initialization with reference to FIG. 9. In this figure, it is assumed that a relation initially set up between an image input signal and laser output is as indicated by 901a, data detected by the optical sensor 208 for the laser output then as indicated by 901b, a relation between a surface electric potential on the photosensitive drum 103 and a quantity of toner deposited on the photosensitive drum 103 obtained by means of the method as described above as indicated by 901c, and a relation between an image input signal and a quantity of toner deposited on the photosensitive drum 103 as indicated by 901d.

If output from the optical sensor 208 after a specified time has passed changes to a value as indicted by 902b, it suggests that the development characteristics has changed from the state as indicated by 901c to the state as indicated by 902c. In other words, it suggests that the relation between a quantity of toner deposited on the photosensitive drum 103 and an image input signal has changed from the state as indicated by 901d to the state as indicated by 902d. Therefore, it may be said that the gradient changes in a specified time after initialization of the apparatus.

Change of gradient from the initial one to that in a specified time is not desirable because it degrades reproducibility of an image. In this embodiment, a processing for correcting the development characteristics as a function of elapsed time is executed as described below.

As the relation between an image input signal n initially set up and laser output P is linear as indicated by 901a, so the following equation is obtained:

$$P = P_{MAX}/FF(H) \times n$$

wherein $P_{MAX}$ is a quantity of laser beam when the image input signal is FF (H).

When the relation between an image input signal and laser output is linear as indicated by 901a, laser output to the image input signal i is $P_i$, indicating that a quantity of toner deposited on the photosensitive drum 103 changed from the initial value of i0 to jt in a specified time. On the other hand, laser output to the image input signal j is $P_j$, indicating that a quantity of toner deposited on the photosensitive drum 103 changed from j0 to jt in a specified time.

In the case described above, especially when i0 is equal to jt, if i is changed to $P_i$ and i to $P_j$, it apparently seems that an image density (a quantity of deposited toner) to an image input signal does not change even after a specified time has passed.

Thus, by executing a similar processing with an np pieces (12 pieces in this embodiment) of detected data, it is possible to obtain the characteristics of γ correction (as indicated by the line 902a) in a specified time. In this step, a value for a point between actual measurement points can be obtained by carrying out linear interpolation or interpolation by using a spline or other appropriate curve. Also it is not always necessary to execute computing for all points, and data for γ correction (as indicated by the line 902a) may be obtained by executing the above computing for an np pieces of detected data point or some of the detected points and selecting a look-up table previously stored in the ROM 314 using the values.

Figure 12:
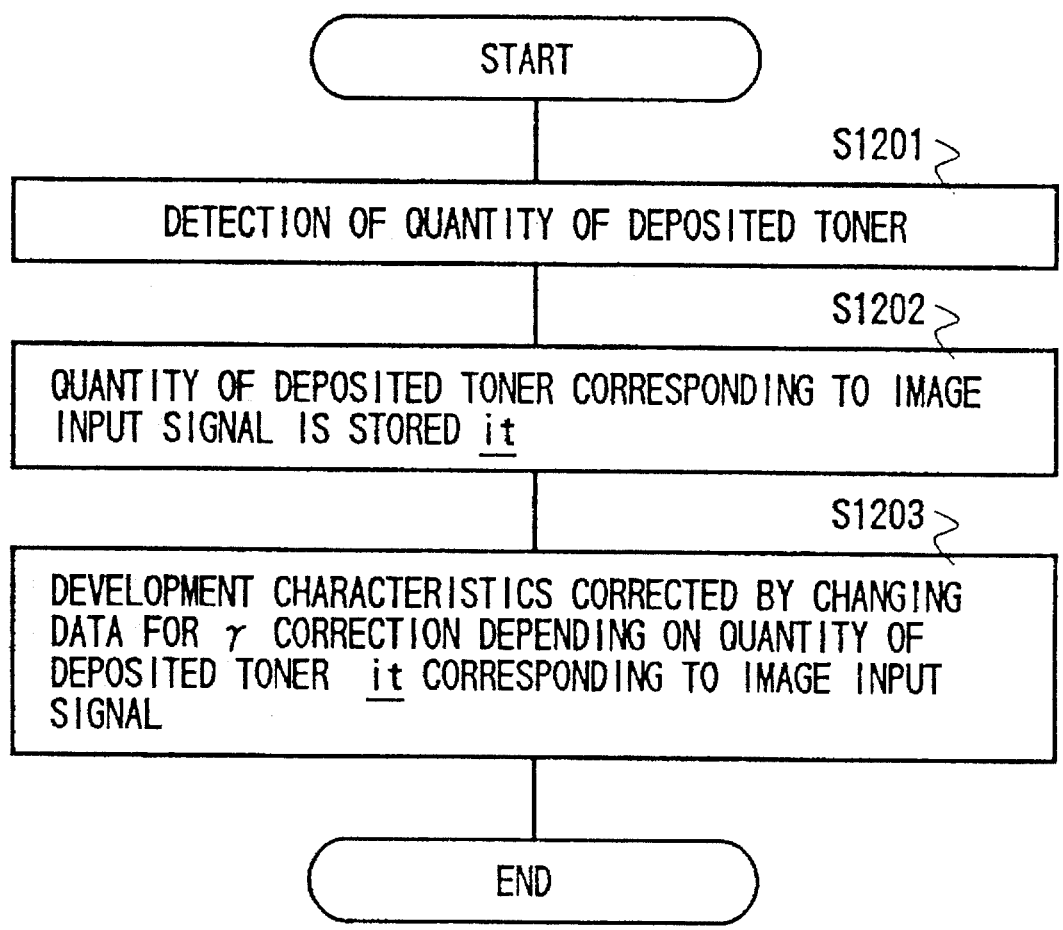
FIG. 12 is a flow chart of a processing for correcting the development characteristics.

FIG. 12 is a flow chart of a processing for correcting the development characteristics, and herein detection of the development characteristics is carried out by executing the processing A for detection of a quantity of deposited toner as well as the processing B for detection of a quantity of deposited toner (S1201). Then, a quantity of deposited toner corresponding to an image input signal is stored as it (S1202). Then the development characteristics is corrected by changing the data for γ correction depending on the quantity of deposited toner it corresponding to the image input signal (S1203).

with the processing as described above, if the development characteristics changes in a specified time after initialization, the development characteristics can be corrected by changing the data for γ correction so that the gradient will not apparently change even in a specified time after initialization.

Assuming that laser output to the image input signal FF (H) is $P_{MAX}$ (t) and laser output to the image input signal FF (H) initially set up is $P_{MAX}$ (0) in the data for γ correction in a specified time (as indicated by the line 902a) obtained through the processings described above, as a method of correction to be carried out when $P_{MAX}$ (0) is not equal to $P_{MAX}$, the following two ways are allowable; one is to use up to the image input signal k corresponding to a state where $P_{MAX}$ (t) is equal to $P_K$ (0) maintaining the resolution between the laser output P00 to the image input signal 00(H) and $P_{MAX}$ (0), and the other is to maintain the resolution of 8 to 10 bits between the laser output P00 to the image input signal 00 (H) and $P_{MAX}$ (t), and the present invention is limited to any of the ways, so that either method may be used. In the former method, however, as the maximum value of a quantity of reflected light is not changed, control of conditions for image forming is simple, but a practical number of grades decreases, which is a disadvantage.

As described above, in the present embodiment, it is possible to carry out measurement of a quantity of toner deposited on the photosensitive drum 103 even a region of a quantity of deposited toner where the sensitivity of the optical sensor 208 is small. Also it is possible to correct an image signal so that a desirable image density can be obtained not only for an image signal corresponding to a low quantity of deposited toner but also for an image signal corresponding to a high quantity of deposited toner even if the development characteristics changes due elapse of time.

Figure 13:
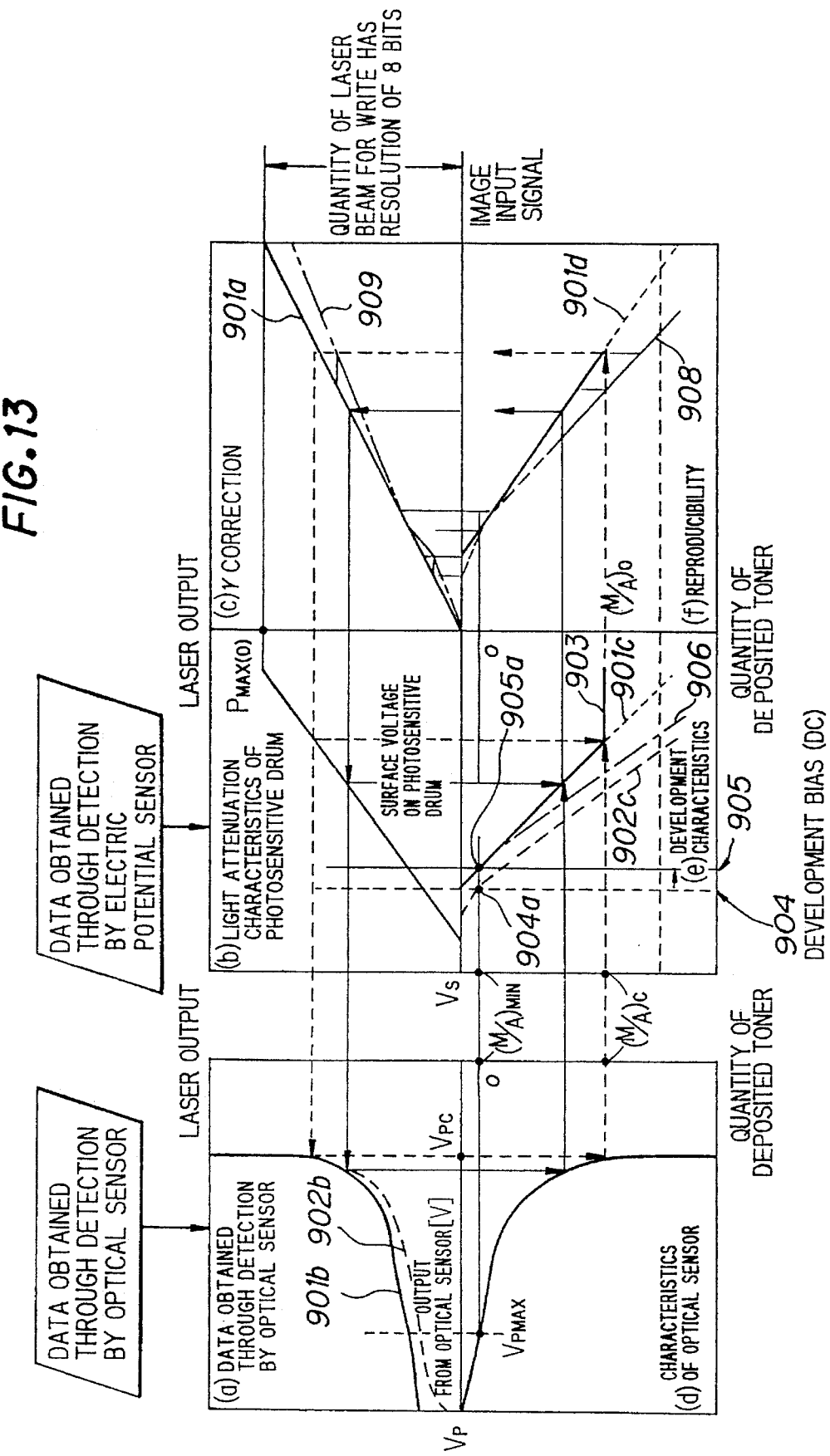
FIG. 13 is a view illustrating another example of a processing for correcting the development characteristics as a function of elapse of time.

Also as an example of a processing for correcting the development characteristics as a function of elapsed time, it is possible, for instance as shown in FIG. 13, to change a surface electric potential to a quantity of deposited toner when development is started (herein, $(M/A)_{MIN}$) from a value indicated by 904a to that indicated by 905a by changing a development bias, which is one of conditions for image forming, from the state indicated at 904 to that indicated at 905. As a result, the relation between a surface electric potential on the photosensitive drum 103 and a quantity of toner deposited on the photosensitive drum 103 changes from the state indicated by the line 901c to that indicated by the line 902c. It should be noted that the surface electric potential indicated by the reference numeral 905 is selected so that the value coincides with the electric potential indicated by the reference numeral 904 when the development is started.

In this case, a difference to be correction between an image input signal and laser output (a difference between the line 901a and the line 902a, and that between 901a and 909 is a value shown by the difference between 901a and 909, which is smaller as compared to a value expressed by the difference between 901a and 902a shown in FIG. 9. For this reason, in a system where a correction table is selected from a look-up table, a correction width is small, which in turn provides the possibility to reduce a storage capacity of the correction table. Also, in addition to control of a development bias, the same effect can be achieved by controlling such factors as a electrified electric potential of the photosensitive drum 103.

FIG. 14 is a flow chart illustrating another example of a processing for correction of the development characteristics as a function of elapsed time. FIG. 14 shows a case where the step S1401 to change conditions for image forming is added to the flow chart shown in FIG. 12.

With the processings described above, it is possible to appropriately change conditions for image forming so that a desirable gradient can be obtained even if the development characteristics changes under the influence by change of a developer or such components as a photosensitive body due to elapse of time.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A deposited toner quantity measuring method for measuring a quantity of deposited toner corresponding to a gradient of a gradated density pattern by irradiating a beam onto a visual image of a gradated density pattern formed on an image carrier and detecting a quantity of reflected light with an electrophotosensitive chip, comprising the steps of:

detecting a surface electric potential on an electrostatic latent image of the gradated density pattern;

measuring a quantity of reflected light from a visual image of the gradated density pattern;

classifying the quantity of reflected light as corresponding to a saturated range or an unsaturated range;

obtaining a first relational expression between a surface electric potential and a quantity of deposited toner when the quantity of reflected light is in said unsaturated range;

obtaining a second relational expression between the quantity of reflected light in said unsaturated range and the quantity of deposited toner; and computing a quantity of deposited toner using said second relational expression when the quantity of reflected light is in said unsaturated range, and using said first relational expression when the quantity of reflected light is in said saturated region.

2. A deposited toner quantity measuring method according to claim 1, wherein said unsaturated range is a range where a value $V_P$ detected by said electrophotosensitive means from a quantity of deposited toner on an image carrier is not less than a specified value $V_{PC}$.

3. A deposited toner quantity measuring method according to claim 1, wherein said unsaturated range is a range where an absolute value $|\Delta V_P/\Delta(M/A)|$ of a variation in the value $V_P$ detected by the electrophotosensitive means from a variation $\Delta(M/A)$ in a quantity of deposited toner (M/A) on an image carrier is equal to or larger than a specified value $|\Delta V_P\Delta(M/A)|_o$.

4. A deposited toner quantity measuring method according to claim 1, wherein said relational expression between a surface electric potential and a quantity of deposited toner is:

$(M/A)=\alpha \times V_s+\beta(\alpha, \beta$: Constants)

wherein $V_s$ is a surface electric potential and (M/A) is a quantity of deposited toner, or $(M/A)=\alpha \times (V_s-V_{DC})+\beta(\alpha, \beta$: Constants)

wherein $V_{DC}$ is a DC component of a development bias.

5. An image forming apparatus having a gradated density pattern forming means for forming an electrostatic image of a gradated density pattern on an image carrier, a surface electric potential detecting means for detecting a surface electric potential of the electrostatic image of said gradated density pattern, a developing means for forming a visual image of the gradated density pattern on the image carrier by developing the electrostatic latent image of said gradated density pattern, an electrophotosensitive means for detecting a quantity of reflected light from a visual image of a gradated density pattern formed on said image carrier, and an image forming means for forming an electrostatic image on an image carrier depending on an image signal, comprising:

a classifying means for classifying the quantity of reflected light as being in a saturated range or an unsaturated range;

a first storage means for storing a result of detection by said surface electric potential detecting means;

a second storage means for storing a result of detection by said electrophotosensitive means when said classifying means has classified the quantity of reflected light as being in said saturated range and for storing a quantity of deposited toner obtained from a result of detection by said electrophotosensitive means when said classifying means has classified the quantity of reflected light as being in said unsaturated range; and means for computing a deposited toner quantity based on the result of detection stored in said second storage means when the quantity of reflected light is in said unsaturated range, and when the quantity of reflected light is in said saturated range, based on the result of detection stored in said first storage means and a quantity of deposited toner in said unsaturated range.

6. An image forming apparatus according to claim 5, wherein said unsaturated range is a range where a value $V_P$ detected by said electrophotosensitive means from a quantity of deposited toner on an image carrier is not less than a specified value $V_{PC}$.

7. An image forming apparatus according to claim 5, wherein said unsaturated range is a range where an absolute value $|\Delta V_P/\Delta(M/A)|$ of a variation in the value $V_P$ detected by the electrophotosensitive means to a variation $\Delta(M/A)$ in a quantity of deposited toner (M/A) on an image carrier is equal to or larger than a specified value $|\Delta V_P/\Delta(M/A)|_o$.

8. An image forming apparatus according to claim 5, wherein said relational expression between a surface electric potential and a quantity of deposited toner is:

$(M/A) = \alpha \times V_S + \beta (\alpha, \beta$: Constants$)$ wherein $V_S$ is a surface electric potential and (M/A) is a quantity of deposited toner, or $(M/A) = \alpha \times (V_S - V_{DC}) + \beta (\alpha, \beta$: Constants$)$ wherein $V_{DC}$ is a DC component of a development bias.

9. An image forming apparatus according to claim 5, wherein said image forming apparatus comprises an image forming changing means for changing conditions for image forming by estimating development characteristics from a quantity of deposited toner obtained by said deposited toner quantity computing means and a result of detection by said surface electric potential detecting means and according to the estimated development characteristics.

10. An image forming apparatus having a gradated density pattern forming means for forming an electrostatic image of a gradated density pattern on an image carrier, a surface electric potential detecting means for detecting a surface electric potential of the electrostatic image of said gradated density pattern, a developing means for forming a visual image of the gradated density pattern on the image carrier by developing the electrostatic latent image of said gradated density pattern, an electrophotosensitive means for detecting a quantity of reflected light from a visual image of a gradated density pattern formed on said image carrier, and an image forming means for forming an electrostatic image on an image carrier depending on an image signal, comprising:

a classifying means for classifying the quantity of reflected light as being in a saturated range or an unsaturated range;

a first storage means for storing a result of detection by said surface electric potential detecting means;

a second storage means for storing a result of detection by said electrophotosensitive means when said classifying means has classified the quantity of reflected light as being in said saturated range and for storing a quantity of deposited toner obtained from a result of detection by said electrophotosensitive means when said classifying means has classified the quantity of reflected light as being in said unsaturated range;

means for computing a deposited toner quantity based on the result of detection stored in said second storage means when the quantity of reflected light is in said unsaturated range, and when the quantity of reflected light is in said saturated range based on the result of detection stored in said first storage means and a quantity of deposited toner in said unsaturated range; and an image signal correcting means for correcting an image signal by altering development characteristics according to a quantity of deposited toner computed by said computing means and said result of detection by said surface electric potential detecting means.

11. An image forming apparatus according to claim 10, wherein said unsaturated range is a range where a value $V_P$ detected by said electrophotosensitive means from a quantity of deposited toner on an image carrier is not less than a specified value $V_{PC}$.

12. An image forming apparatus according to claim 10, wherein said unsaturated range is a range where an absolute value $|\Delta V_P/\Delta(M/A)|$ of a variation in the value $V_P$ detected by the electrophotosensitive means to a variation $\Delta(M/A)$ in a quantity of deposited toner (M/A) on an image carrier is equal to or larger than a specified value $|\Delta V_P/\Delta(M/A)|_o$.

13. An image forming apparatus according to claim 10, wherein said relational expression between a surface electric potential and a quantity of deposited toner is:

$(M/A) = \alpha, \times V_S + \beta (\alpha, \beta$: Constants$)$ wherein $V_S$ is a surface electric potential and (M/A) is a quantity of deposited toner, or $(M/A) = \alpha \times (V_S - V_{DC}) + \beta (\alpha, \beta$: Constants$)$ wherein $V_{DC}$ is a DC component of a development bias.

14. An image forming apparatus according to claim 10, wherein said image forming apparatus comprises an image forming changing means for changing conditions for image forming.

* * * * *